(12) United States Patent
Van Dijk

(10) Patent No.: US 9,566,749 B2
(45) Date of Patent: Feb. 14, 2017

(54) SYSTEM AND METHOD FOR MANUFACTURING OPHTHALMIC DEVICES

(71) Applicant: INNOVALENS B.V., Eindhoven (NL)

(72) Inventor: Emerentius Maria Josephus Antonius Van Dijk, Eindhoven (NL)

(73) Assignee: INNOVALENS B.V., Eindhoven (NL)

( * ) Notice: Subject to any disclaimer, the term of this patent is extended or adjusted under 35 U.S.C. 154(b) by 0 days.

(21) Appl. No.: 14/426,460

(22) PCT Filed: Sep. 6, 2013

(86) PCT No.: PCT/NL2013/050642
§ 371 (c)(1),
(2) Date: Mar. 6, 2015

(87) PCT Pub. No.: WO2014/038938
PCT Pub. Date: Mar. 13, 2014

(65) Prior Publication Data
US 2015/0239186 A1 Aug. 27, 2015

(30) Foreign Application Priority Data
Sep. 7, 2012 (NL) ...................................... 2009433

(51) Int. Cl.
*B29D 11/00* (2006.01)

(52) U.S. Cl.
CPC ..... *B29D 11/00038* (2013.01); *B29D 11/0099* (2013.01); *B29D 11/00134* (2013.01); *B29D 11/00182* (2013.01); *B29D 11/00259* (2013.01)

(58) Field of Classification Search
CPC ................... B29D 11/00038; B29D 11/00182; B29D 11/00259; B29D 11/0099; B29D 11/00134
See application file for complete search history.

(56) References Cited

U.S. PATENT DOCUMENTS 9,102,108 B2 * 8/2015 Tucker ............. B29D 11/00125
2007/0195311 A1 8/2007 Morgan et al.

FOREIGN PATENT DOCUMENTS

| EP | 0 686 491 A2 | 12/1995 |
| EP | 0 686 491 B1 | 5/2003 |
| WO | WO 03/013832 A1 | 2/2003 |

\* cited by examiner

*Primary Examiner* — Mathieu Vargot
(74) *Attorney, Agent, or Firm* — Birch, Stewart, Kolasch & Birch, LLP

(57) ABSTRACT

A system for manufacturing ophthalmic devices, in particular contact lenses or intraocular lenses, includes at least one injection molding machine for manufacturing a cup bottom part and cup top part to form a cast mold, a cooling station, an injection assembly arranged for injecting an amount of monomeric material into the cup bottom part, a curing assembly, a first optical inspection assembly for determining at least one first optical cup part parameter, a second optical inspection assembly for determining at least one optical combination parameter of the combination of the cured monomeric material formed into a lens and the cup part that bears the lens, and an electronic control provided with a calculation module for determining at least one optical lens parameter of the lens on the basis of the cup part parameter and the combination parameter. Possibly, production parameters can be adjusted on the basis of trend changes of the lens parameters of produced lenses.

21 Claims, 11 Drawing Sheets

SYSTEM AND METHOD FOR MANUFACTURING OPHTHALMIC DEVICES

FIELD OF THE INVENTION

The invention relates to a system for manufacturing ophthalmic devices, in particular contact lenses or intraocular lenses.

BACKGROUND

EP-0 686 491 B1 describes a method for manufacturing contact lenses with the aid of cast molding. In the publication it is described that a cast mold is manufactured with the aid of injection molding. The known apparatus is rather complicated and hence costly. While in the known apparatus cast molds provided with a cup bottom part and a cup top part are formed, these parts are not provided with special provisions allowing them to be clamped onto each other. As a result of the lack of such clamping means, during hardening of the monomeric material introduced into the cup bottom part for forming a contact lens, the top part has to be continuously pressed onto the cup bottom part with an external press-on device especially provided for that purpose. This leads to a relatively costly apparatus. Further, a part of the manufacturing process is to take place under vacuum, which also adversely affects the costs of the total system to a considerable extent.

SUMMARY

The invention contemplates the provision of a system for manufacturing ophthalmic devices, whereby the above-described disadvantages of the known apparatus are at least partly alleviated. More particularly, the invention contemplates providing a system for manufacturing ophthalmic devices whereby the quality of the ophthalmic devices remains within defined norms throughout the production process. To this end, the invention provides a system for manufacturing ophthalmic devices, in particular contact lenses or intraocular lenses, the system comprising:

- at least one injection molding machine configured for manufacturing a cup bottom part and cup top part to form a cast mold comprising a cup bottom part and cup top part;
- a cooling station;
- a plurality of carriers which are transportable along a transport path through a part of the system;
- a manipulator assembly which is configured for:
  - taking a said cup bottom part and a said cup top part out of the at least one injection molding machine and placing them in the cooling station; and for
  - taking the cup bottom part out of the cooling station and placing it on a carrier of said plurality of carriers that is in a carrier intake position, and configured for placing a said cup top part on the cup bottom part placed on the carrier;
- an injection assembly which is arranged for injecting an amount of monomeric material into the cup bottom part;
- a curing assembly provided with lamps emitting electromagnetic radiation which promotes the hardening of the monomeric material;
- a first optical inspection assembly which is disposed upstream of the injection assembly, which first optical inspection assembly is configured for determining at least one first optical cup part parameter of at least the cup part that bears the lens in a part of the system downstream of the curing assembly;
- a second optical inspection assembly which is disposed after the curing assembly and which is configured for determining at least one optical combination parameter of the combination of the cured monomeric material formed into a lens and the cup part that bears the lens, the at least one combination parameter being of the same type as the at least one cup part parameter;
- an electronic control provided with a calculation module for determining at least one optical lens parameter of the lens on the basis of the at least one cup part parameter and at least one combination parameter determined in the first and the second optical inspection assembly, the at least one lens parameter being of the same type as the at least one cup part parameter.

With the aid of such a system, it is enabled to continuously produce contact lenses or intraocular lenses of which at least one relevant lens parameter is continuously determined. In itself, determining a lens parameter, e.g., a lens parameter indicative of a lens power map, of a lens which is in a cup part, is not possible. This is due to the fact that it is not possible to perform an optical measurement on the lens alone with light that passes both the lens and the lens-bearing cup part. However, by utilizing two optical measuring devices, whereby the first optical measuring device measures the cup part parameter of the cup part that bears the lens in a later stage, and whereby the second optical measuring device measures the combination parameter of the combination of the lens-bearing cup part and a lens formed therein, and by compensating this combination parameter with the cup part parameter, a resultant parameter is obtained which is indicative of a property of the lens as such and which can hence be rightly designated as lens parameter. As during the manufacture of a series of lenses, of each lens at least one lens parameter is determined, an accurate control of the production process is thereby rendered possible. Such control and adjustment of the production process can, according to another elaboration of the invention, take place in an automated manner through automated adjustment of particular production parameters on the basis of trend changes of the lens parameter. Moreover, with the first optical inspection assembly it can be established directly whether the produced cup bottom part and/or cup top part meet(s) the required quality requirements in order to produce a lens therein. When it appears that the quality is not sufficient, the cup bottom part can be taken out of the production process directly, which results in a saving of monomeric material.

Suitable optical parameter types can, according to a further elaboration of the invention, be selected from a group of parameter types which comprises:

- a parameter indicative of the lens power map;
- the dioptry of the lens averaged over the surface;
- minimum and maximum dioptry of the lens;
- corrected wave front P/V (wave front peak/valley);
- corrected wave front RMS (root mean square of the absolute peak/valley);
- Point Spread Function (PSF);
- Modulation Transfer Function (MTF);
- Phase Transfer Function (PTF);
- a parameter indicative of cosmetic defects, such as scratches, bubbles and pits;
- a radius of curvature (ROC);
- an axis for toric lenses;
- surface form deviations;
- Zernike coefficients or Zernike polynomials ($Z^m_n$).

In this regard, preferably, parameters are eligible that are indicative of properties of the power map of the lens.

Further elaborations of the system are described in the dependent claims and will be further clarified hereinafter on the basis of an exemplary embodiment, with reference to the drawings.

The invention also provides a method for manufacturing ophthalmic devices, in particular contact lenses or intraocular lenses, the method comprising:
- with the aid of injection molding, manufacturing a cup bottom part and a cup top part to form a cast mold which comprises a cup bottom part and cup top part;
- cooling the cup bottom part and the cup top part;
- by means of a first optical measurement, determining at least one optical cup part parameter of at least the cup part that bears the lens after a curing step;
- injecting an amount of monomeric material into the cup bottom part and after injection placing the cup top part on the cup bottom part;
- curing the monomeric material;
- by means of a second optical measurement, determining at least one optical combination parameter of the combination of the cured monomeric material formed into a lens and the cup part bearing the lens, the at least one combination parameter being of the same type as the at least one optical cup part parameter;
- by calculation, determining at least one optical lens parameter of the lens on the basis of the at least one cup parameter and at least one combination parameter, the at least one lens parameter being of the same type as the at least one cup part parameter.

The method has the same advantages as the above-described system.

In a further elaboration, a method is provided which comprises:
- repeating the above-described method to form a series of cup bottom parts, cup top parts and lenses;
- monitoring trend changes of the at least one lens parameter of the series of lenses; and
- during production, regulating at least one production parameter for control of the trend change.

With the aid of such a method, various production parameters can be adjusted on the basis of trend changes that are observed in the at least one lens parameter of the successively produced intraocular lenses or contact lenses. Production parameters that can be adjusted are described in the detailed description below and can relate to, inter alia, injection molding temperature, injection molding pressure, after-pressure during the injection molding process, after-pressure duration during the injection molding process, amount of monomeric material, curing time, cooling time, and the like.

DETAILED DESCRIPTION

Figure 1:
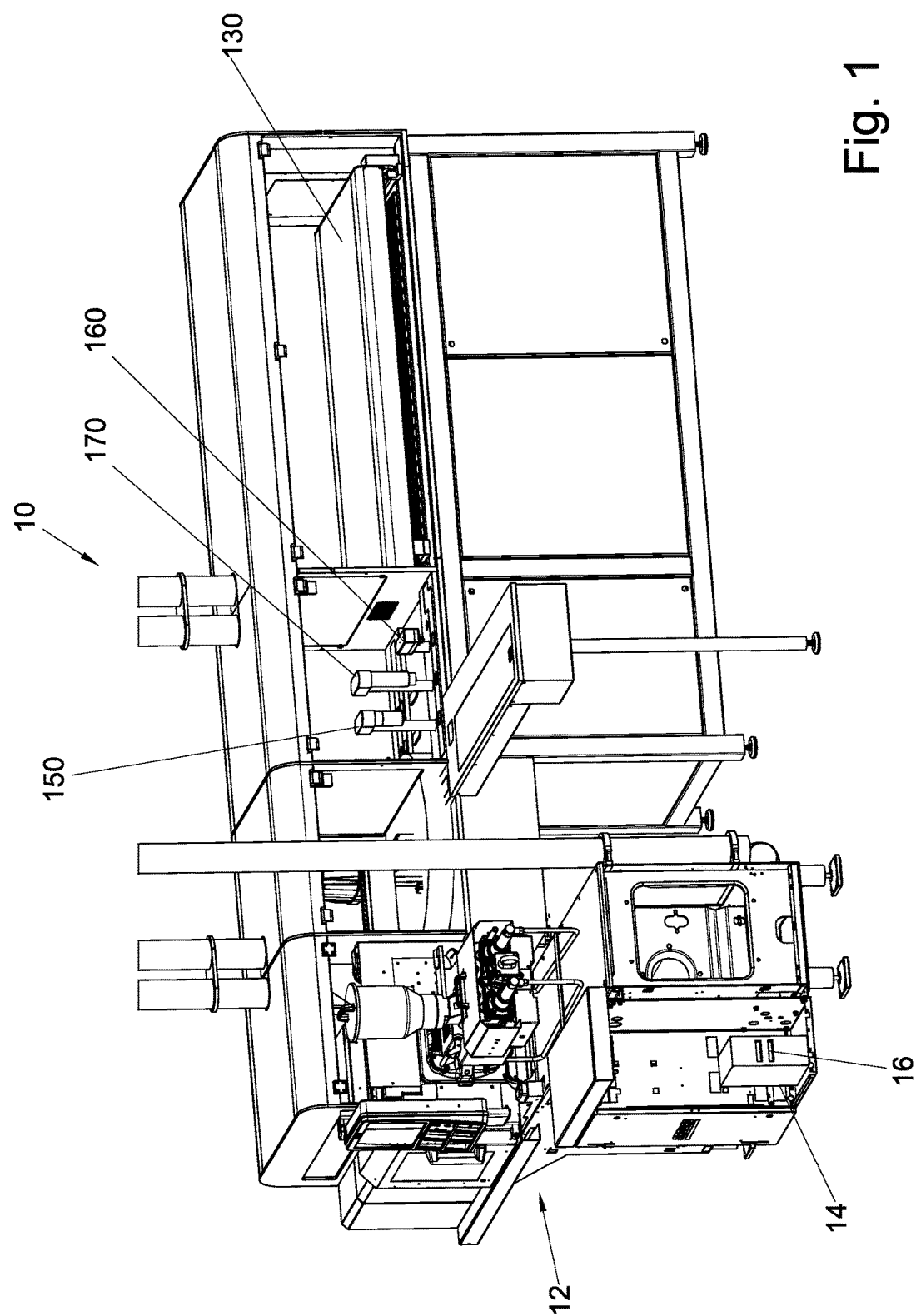
FIG. 1 shows a perspective view of an exemplary embodiment.
Figure 2:
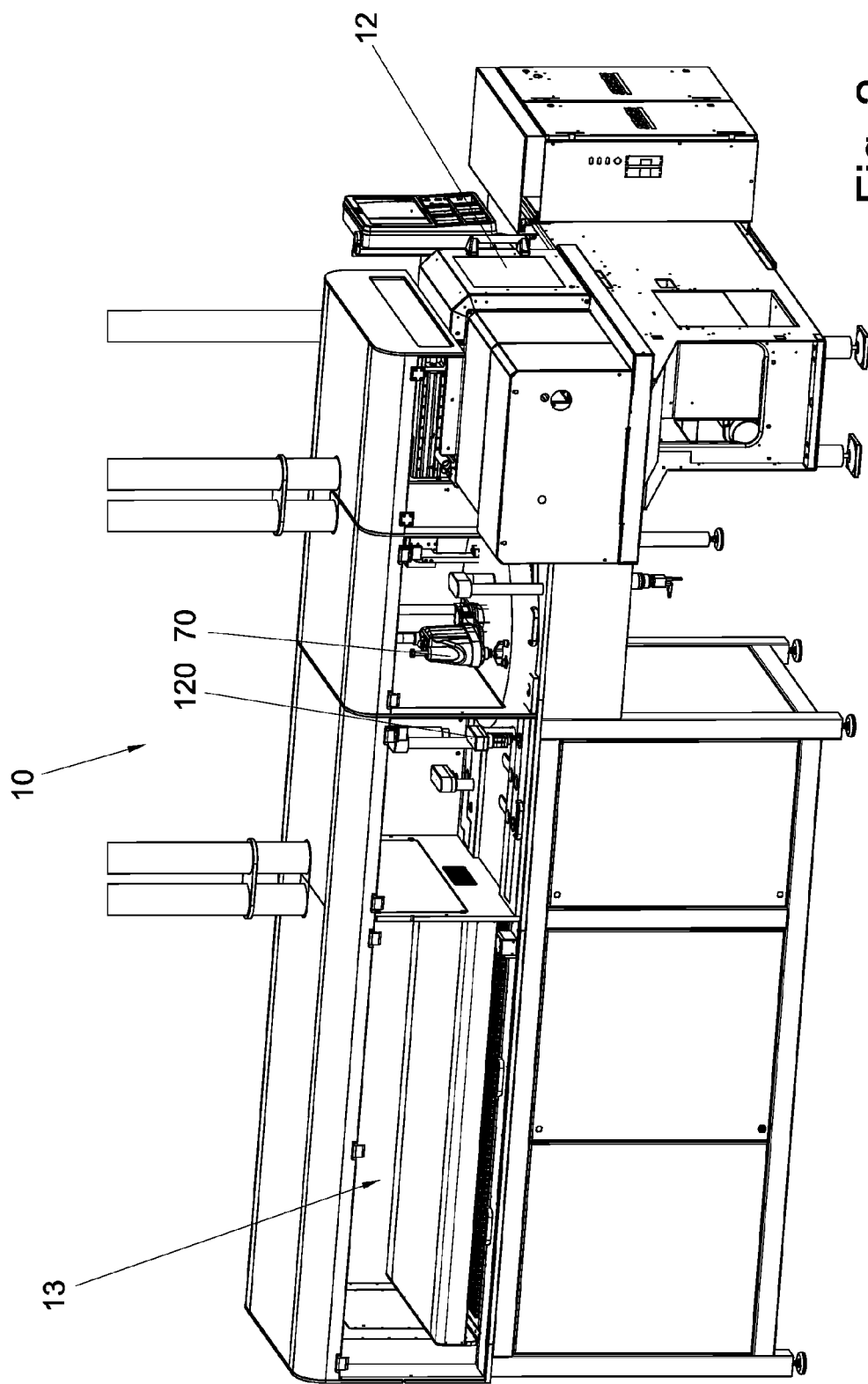
FIG. 2 shows a perspective view from a different viewpoint of the exemplary embodiment represented in FIG. 1.
Figure 3:
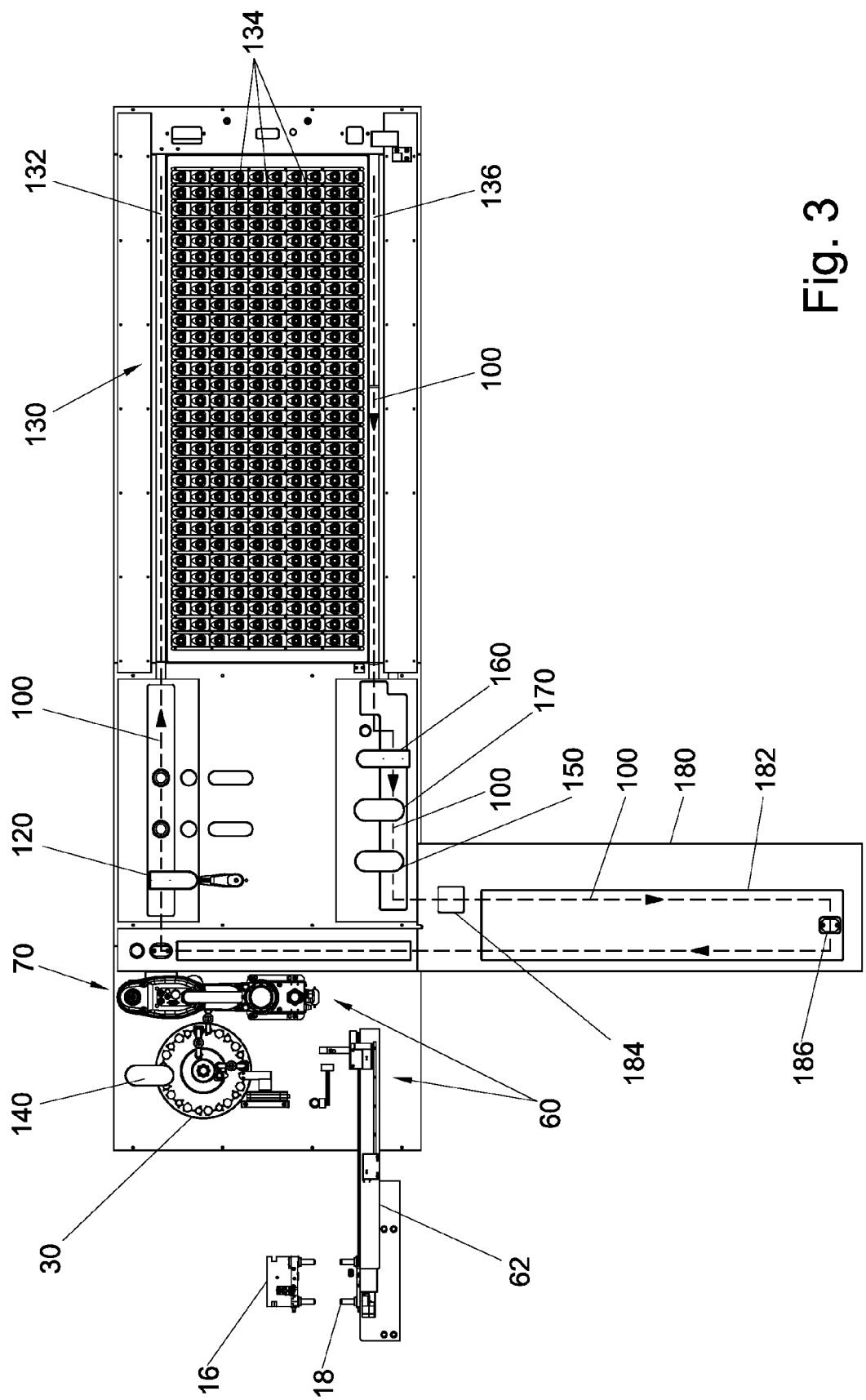
FIG. 3 shows a top plan view of the relevant parts of the exemplary embodiment represented in FIG. 1.

Referring to FIGS. 1-3, the apparatus will first be described in broad outline. In the most general terms, it concerns a system for manufacturing ophthalmic devices, in particular contact lenses or intraocular lenses. The system comprises at least one injection molding machine 12 which is configured for manufacturing a cup bottom part 202 and cup top part 204 to form a cast mold which comprises a cup bottom part 202 and a cup top part 204. Further, the system includes a cooling station 30 which will be described in more detail hereinafter with reference to FIG. 6. The system is provided with a plurality of carriers 80 (see FIG. 10) which are transportable along a transport path 100 through a part of the system 10. The system is further provided with a manipulator assembly 60, 70 which is configured for taking a cup bottom part 202 and a cup top part 204 out of the at least one injection molding machine 12 and placing them in the cooling station 30. The part 60 of the manipulator assembly 60, 70 that performs those operations will be described in more detail with reference to FIG. 4 and FIG. 5. The manipulator assembly 60, 70 is further configured for taking the cup bottom part 202 out of the cooling station 30 and placing it on a carrier 80 of the plurality of carriers 80 that is in a carrier intake position 102. The manipulator assembly 60, 70 is also configured for placing a cup top part 204 on the cup bottom part 202 placed on the carrier 80. The part 70 of the manipulator assembly 60, 70 that performs these operations will be described in more detail with reference to FIG. 6. The system is further provided with an injection assembly 120 which is arranged for injecting an amount of monomeric material into the cup bottom part 202. The injection assembly 120 is discussed in more detail hereinafter with reference to FIG. 7. A curing assembly 130 provided with lamps 131 emitting electromagnetic radiation which promotes the hardening of the monomeric material is also part of the system and will be discussed in more detail with reference to FIG. 8. The system further comprises a first optical inspection assembly 140 which is disposed upstream of the injection assembly 120. The first optical inspection assembly 140 is configured for determining a first at least one optical cup part parameter of at least the cup part 202, 204 that bears the lens after a curing step. In the exemplary embodiment shown, this is the cup bottom part 202. In an alternative exemplary embodiment, however, it is also possible that after decapping the cup bottom part 202 is discharged and the further transport of the lens 200 through the system 10 is done on the cup top part 204. Further, the system comprises a second optical inspection assembly 150 which is disposed after the curing assembly 130 and which is configured for determining at least one optical combination parameter of the combination of the cured monomeric material formed into a lens 200 and the cup part 202, 204 that bears the lens 200, the at least one combination parameter being of the same type as the at least one optical cup part parameter. The second optical inspection assembly 150 will be discussed in more detail with reference to FIG. 9. Finally, the system includes an electronic control 14 which is provided with a calculation module for determining at least one optical lens parameter of the lens 200 on the basis of the at least one cup parameter and at least one combination parameter, the at least one lens parameter being of the same type as the at least one cup part parameter.

In an embodiment, the at least one cup part parameter, the at least one combination parameter and the at least one lens parameter are of a type selected from a group of parameter types which comprises:
  a parameter indicative of the lens power map;
  the dioptry of the lens averaged over the surface;
  minimum and maximum dioptry of the lens;
  corrected wave front P/V (wave front peak/valley);
  corrected wave front RMS (root mean square of the absolute peak valley)
  Point Spread Function (PSF);
  Modulation Transfer Function (MTF);
  Phase Transfer Function (PTF);
  a parameter indicative of cosmetic defects, such as scratches, bubbles and pits;
  a radius of curvature (ROC);
  an axis for toric lenses
  surface form deviations
  Zernike coefficients or Zernike polynomials ($Z^m_n$).

The average skilled person is familiar with such optical parameters. Especially optical parameter types that are indicative of the quality of the power map of the lens are of particular interest because those parameters effectively constitute a description of the quality of the lens.

Figure 4:
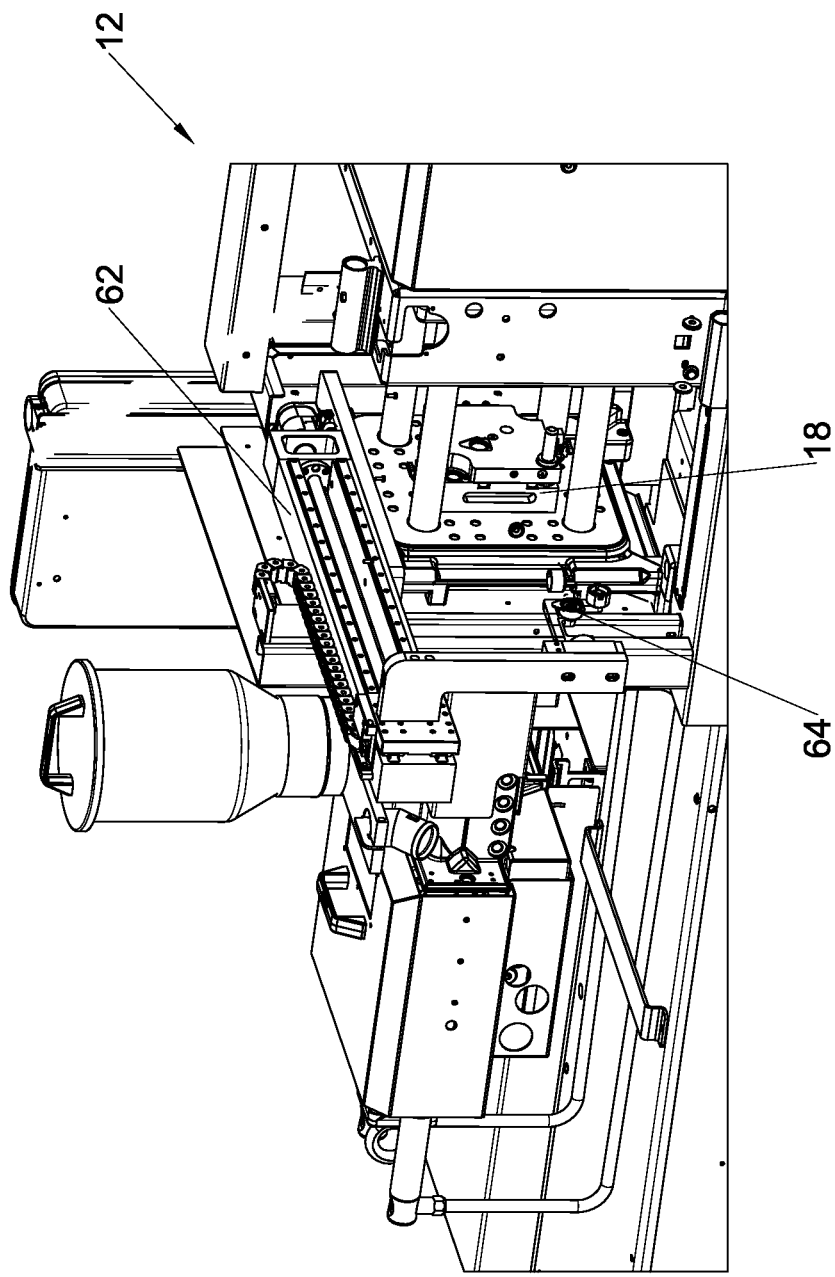
FIG. 4 shows a perspective view of the opened injection mold of the injection molding apparatus.
Figure 5:
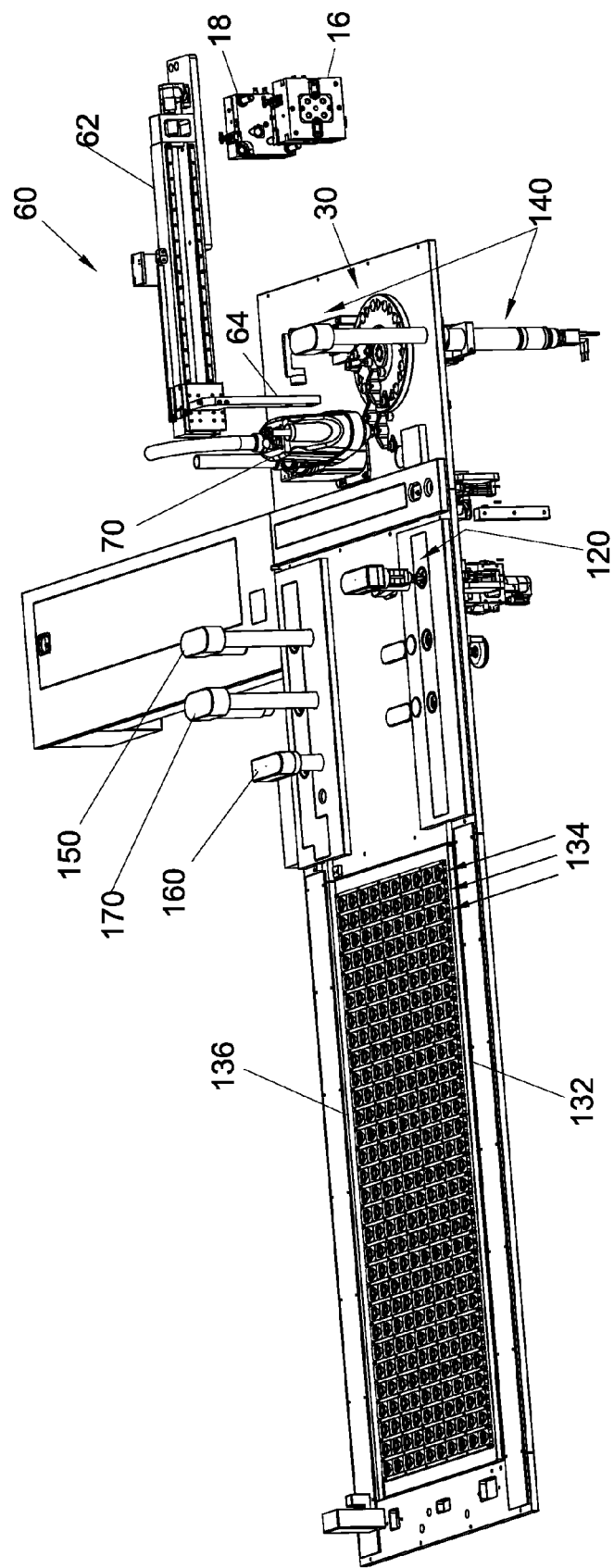
FIG. 5 shows a perspective view of a relevant portion of the exemplary embodiment represented in FIG. 1 with omission of the encasings.
Figure 6:
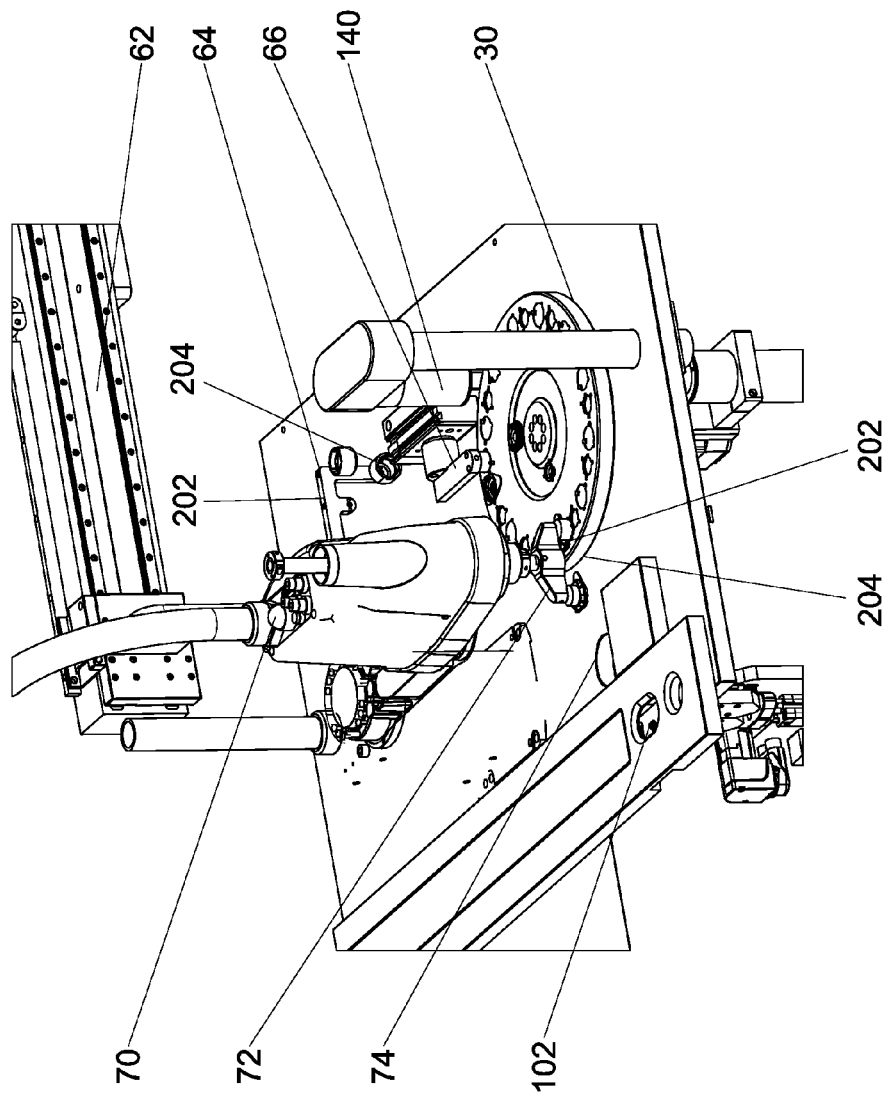
FIG. 6 shows a perspective view of a cooling section.
Figure 7:
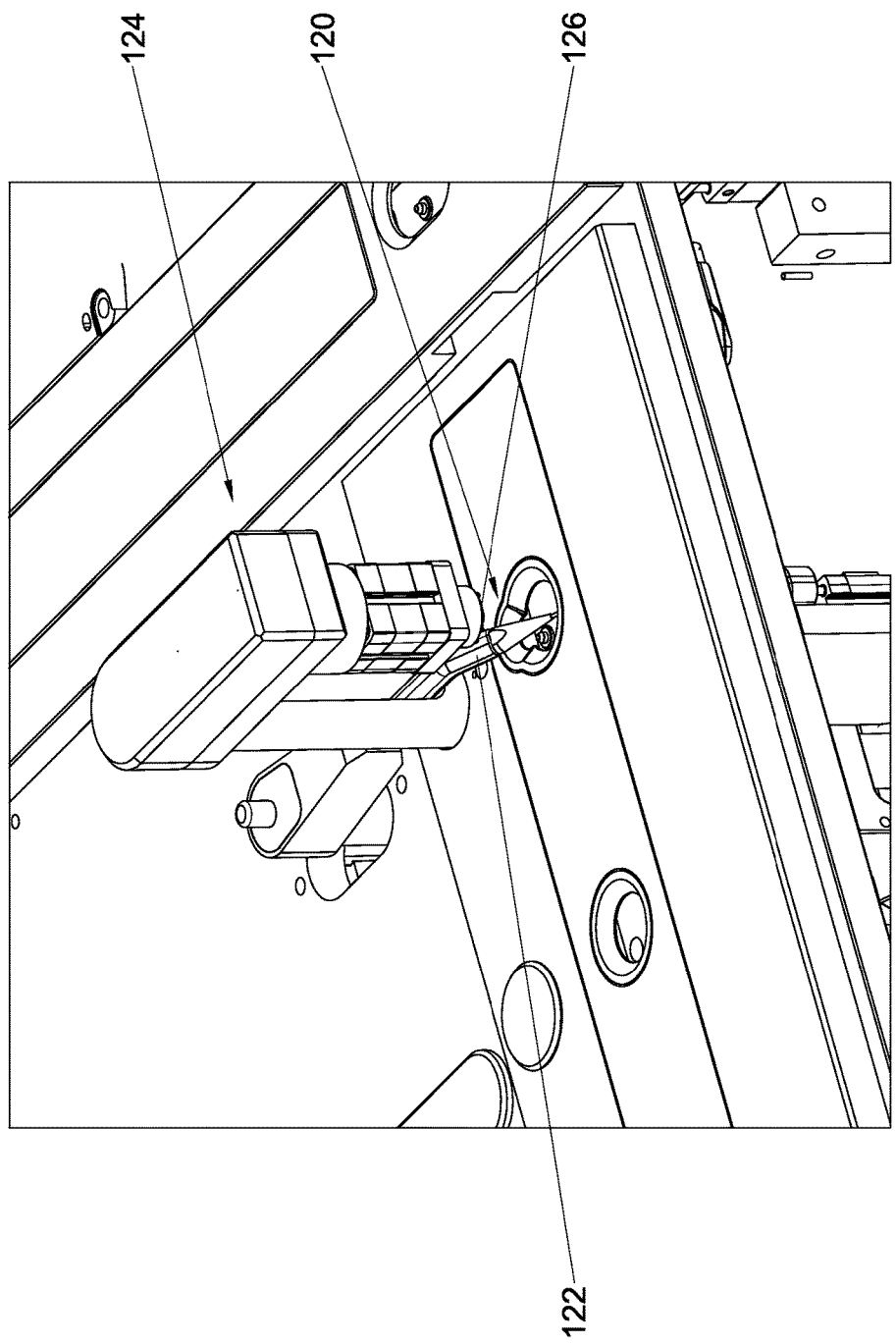
FIG. 7 shows a perspective view of an injection assembly.

FIG. 3 presents a clear overview of the different components of the exemplary embodiment of the system shown in it. Presently, the path that the carriers 80, the cup top parts 204 and the cup bottom parts 202 follow through the system will be described. This path is indicated in FIG. 3 with a broken line. First of all, in the injection molding machine 12 a cup bottom part 202 and a cup top part 204 are manufactured. This manufacture takes place in a mold which is provided with two mold halves 16, 18. In at least one of the mold halves 16, 18, optical inserts may be included which are exchangeable. The use of optical inserts is also described in a previous application of applicant, viz., PCT/NL2012/050404. After the cup bottom part 202 and the cup top part 204 have been manufactured in the injection molding machine, with the aid of the part 60 of the manipulator assembly 60, 70 the cup bottom part 202 and the cup top part 204 are taken out of the mold. In FIGS. 4, 5, and 6, an exemplary embodiment of the part 60 of manipulator assembly 60, 70 is shown with which the cup parts 202, 204 can be taken from the mold halves 16, 18. In this exemplary embodiment, use is made of a pickup head 64 movable along a slide 62. In the exemplary embodiment shown, that part 60 of the manipulator assembly 60, 70 can be of relatively simple design in that, in taking out the cup parts 202, 204 from the mold, the horizontal movement of a mold half 18 is also used to bring the pickup head 64 in engagement with the cup parts 202, 204. When the pickup head 64 has taken the cup parts 202, 204 from the mold, the pickup head 64 moves in FIG. 5 from the mold half 18 via the slide 62 to the left in the direction of the cooling station 30. The cooling station 30 in the exemplary embodiment shown is implemented as a rotatable disc in which the cup top parts and the cup bottom parts 202, 204 can be placed by the first manipulator assembly 60. All this is clearly visible in the top plan view of FIG. 3 and in the perspective view of FIG. 6. The first part 60 of the manipulator assembly 60, 70 may further comprise an intermediate manipulator 66 which inverts the cup top part 204 and places it on the rotating disc 30. The cup bottom part 202 can be taken from the pickup head 64 and placed on the rotating disc 30 with, for instance, a robot arm 70. In the exemplary embodiment shown, the robot arm 70 is a SCARA robot (Selective Compliant Articulated Robot Arm). The rotating disc serving as cooling station 30 forms a kind of buffer in which a number of cup bottom parts 202 and cup top parts 204 can be received to cool and harden.

The SCARA robot 70 of the manipulator assembly 60, 70 shown in the exemplary embodiment is further configured for taking the cup bottom part 202 out of the cooling station 30 and placing it on a carrier 80 being in a carrier intake position 102. In the exemplary embodiment shown, the SCARA robot 70 is provided to that end with a pickup head 72 which is connected to a vacuum source and with the aid of which the cup bottom part 202 and the cup top part 204 can be subjected to suction and thus be taken out of the rotating disc 30. Such vacuum pickups are also present in the pickup head 64 and in the transfer head 66 which have already been mentioned above.

Near the rotatable disc 30 which forms the cooling station, a first optical inspection assembly 140 is disposed. The first optical inspection assembly 140 is preferably a Shack-Hartmann wavefront sensor which is marketed by, for instance, Optocraft GmbH. The first optical inspection assembly is configured for determining at least one cup parameter of the cup bottom part 202 and/or the cup top part 204 which is on the buffering disc 30 of the cooling station. In any case, the at least one cup parameter is to be determined in respect of the cup part 202, 204 that bears the lens 200 after decapping. It will be clear that the first inspection assembly may also be disposed near the carrier intake position 102. If during the measurement with the first optical inspection assembly 140 it appears that the cup bottom part 202 and/or the cup top part 204 does not meet the requirements, then, with the aid of the SCARA robot 70, the cup bottom part 202 and/or the cup top part 204 can be discharged via a discharge opening 74 to a waste bin. However, if the cup bottom part 202 and/or the cup top part 204 does meet the requirements, it can be placed by the SCARA robot on a carrier 80 which is in the carrier intake position 102. Also, with the same SCARA robot, a cup top part 204 is thereupon placed on the cup bottom part 202. This step could also be carried out at a later stage, for instance after injection of monomeric material into the cup bottom part 202. In the present exemplary embodiment, it has been chosen to displace the carrier 80 with the cup bottom part 202 and the cup top part 204 placed thereon together to an injection assembly 120. This displacement can be carried out, for instance, with the aid of a pusher which is not represented in the drawings, but is situated in FIG. 6 to the right of the carrier intake position 102. Thereupon the carrier 80 is transported from the carrier intake position 102 to an injection assembly 120. The injection assembly 120 is shown in more detail in FIG. 7. It comprises a filling nozzle 122 which is set up movably in a Z and a Y direction. Further, a handler 124 is present which is movable up and down in Z direction. The handler 124 is provided with a vacuum pickup head 126 with the aid of which the cup top part 204 can be taken up from the cup bottom part 202. After lifting of the cup top part 204, with the filling nozzle 122 monomeric material is injected into the cup bottom part 202. After this, with the handler 124 the cup top part 204 is placed on the cup bottom part 202 again. The pickup head 126 is provided with a pneumatic press-on facility with the aid of which the cup top part 204 on the cup bottom part 202 can be pressed on, such that the two cup parts are clamped onto each other. The carrier 80 then contains a cast mold filled with monomeric material and can then be further transported in the direction of the curing assembly 130 which is shown in more detail in FIG. 8 and which will be further described below also with reference to FIG. 3.

Figure 8:
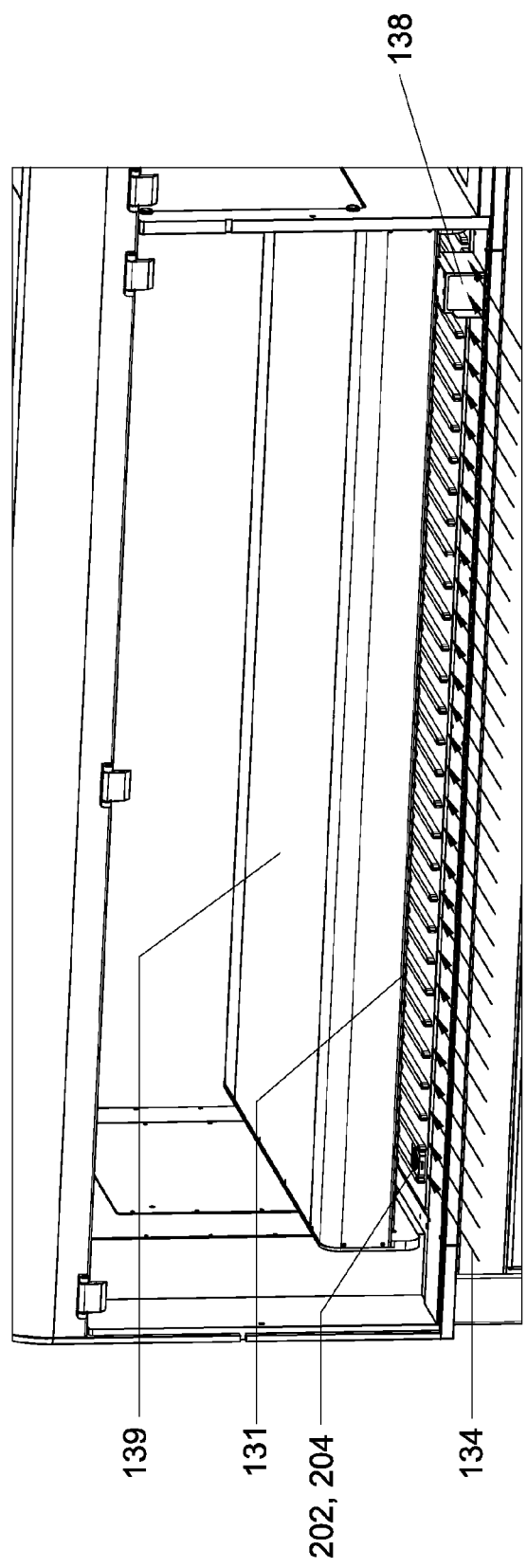
FIG. 8 shows a perspective view of a curing assembly.

The broken line in FIG. 3 shows the transport path to and through the curing assembly 130. The curing assembly 130, as is clearly visible in FIGS. 3 and 5, is provided with a supply path 132 which extends in a first direction. Extending perpendicularly to the supply path are a plurality of curing paths 134 which are mutually parallel. Each curing path is provided with a feed-in side which borders on and links up with the supply path 132, such that a carrier 80 is slidable from the supply path 132 into a curing path 134. Each curing path is further provided with a discharge side and is part of the transport path 100. The curing assembly 130 is further provided with a discharge path 136. The discharge path 136 extends parallel to the supply path 132. The discharge path 136 borders on the discharge sides of the plurality of curing paths 134 and links up therewith, such that a carrier is slidable from a curing path 134 onto the discharge path 136. The discharge path 136 is also part of the transport path 100 of the system. In the exemplary embodiment shown the supply path 132 is provided with an endless conveyor for transport of the carriers 80. The same is true of the discharge path 136 in this exemplary embodiment. For transport in the curing paths 134 use is made of a pusher 138 for each curing path 134. The pusher 138 is disposed adjacent the supply path 132 and is arranged for sliding a carrier 80 from the supply path 132 into a curing path 134 and for thereby pushing up the carriers 80 which are in the respective curing path 134 in the direction of the discharge path 136. Depending on the desired curing time and hence the residence time in the curing paths 134, more or fewer curing paths 134 are filled with carriers having filled cast molds present therein. It will be clear that when the produced cast molds filled with monomer are distributed over a greater number of curing paths 134, it will take longer for such a cast mold to reach the discharge path 136. Thus, in a very simple manner, the curing time can be determined by filling the curing paths 134 in a suitable manner. The curing assembly 130, as appears from FIG. 8, is provided with a light box 139 in which there are lamps 131 emitting an electromagnetic radiation which promotes the hardening of the monomeric material. The electromagnetic radiation can be, for example, UV radiation. However, also visible light, for example, blue light, may be one of the possibilities. Also, the curing assembly 130 may be provided with heating elements which emit infrared radiation or transfer heat to the cast molds and the monomer present therein in a different manner, to shorten the curing rate.

Figure 9:
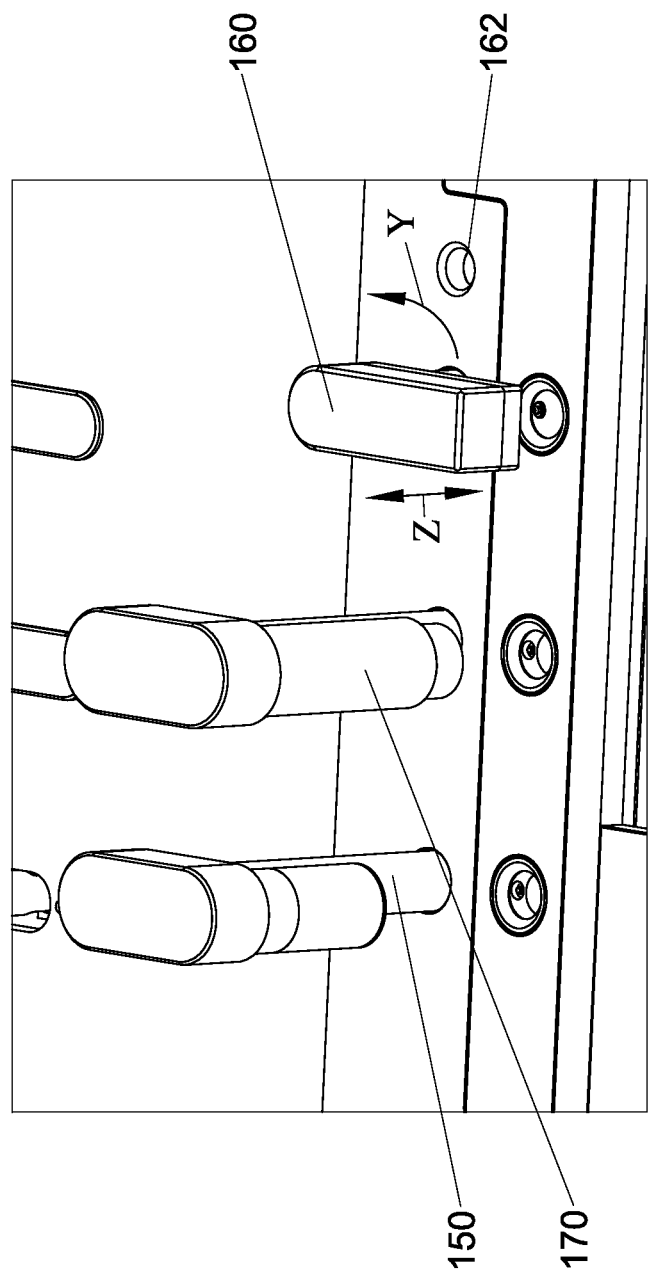
FIG. 9 shows in perspective a decapping section.
Figure 10:
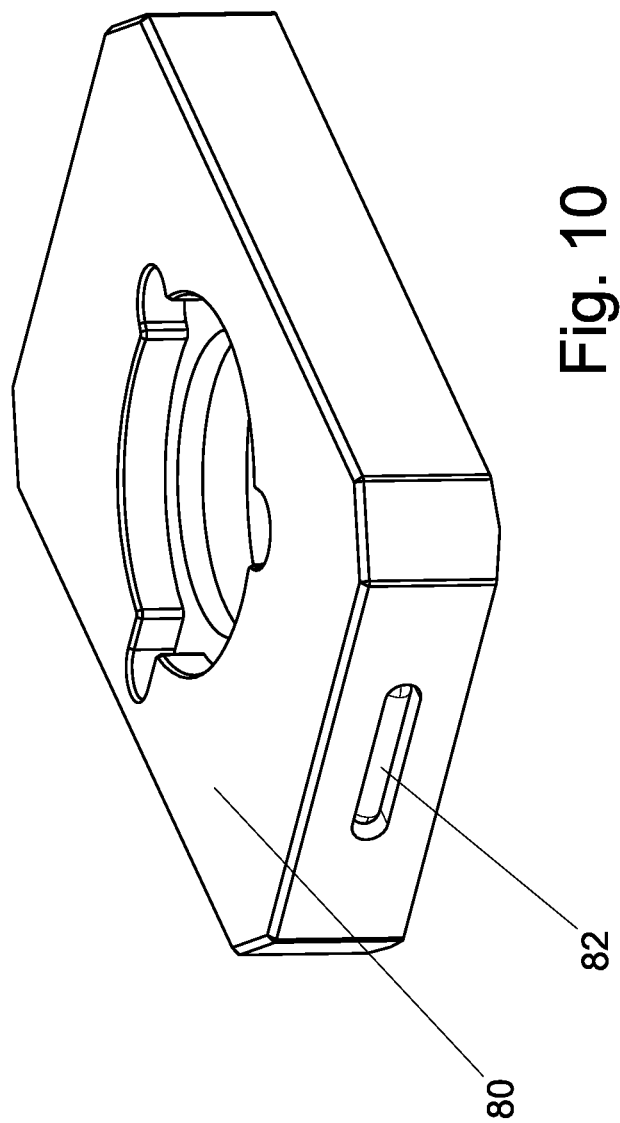
FIG. 10 shows an example of a carrier.
Figure 11:
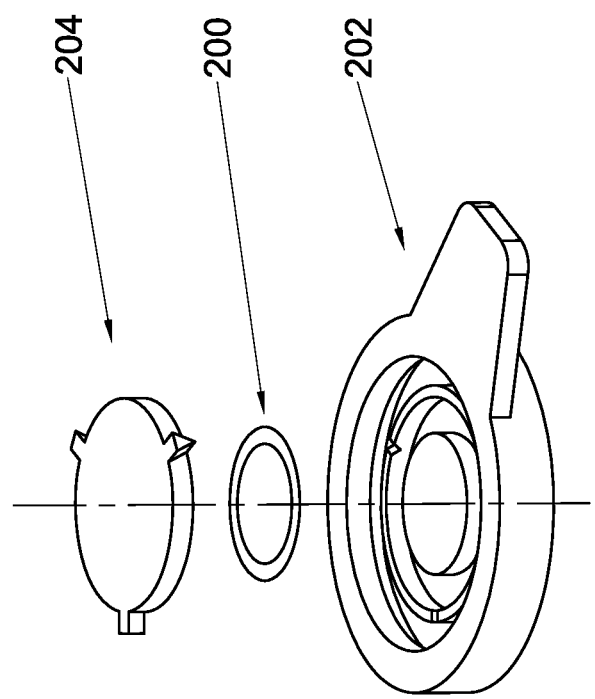
FIG. 11 shows a perspective view of a cup bottom part and a cup top part and a lens situated therebetween.

After a carrier 80 having therein a cast mold with monomeric material formed into lens 200 leaves the curing assembly 130 via the discharge path 136, it arrives at a decapping assembly 160 which is shown in more detail in FIG. 9. The decapping assembly 160 is movable up and down along the axis Z and pivotable about a rotation axis through an angle. The decapping assembly 160 is intended for exposing the lens which has been cured. In a first embodiment, to that end, the cup top part 204 can be removed and the lens 200 is left in the cup bottom part 202. In an alternative embodiment, it is also possible that the decapping assembly 160 removes the cup bottom part 202 and that the further transport of the lens 200 is carried out together with the cup top part 204.

In the swung-clear position, the pickup head of the decapping assembly 160 is above a discharge opening 162 where the cup part 202, 204 that is removed for exposing the lens 200 can be discharged. The decapping assembly 160 is provided with a pickup head which can engage the cup top part 204 with vacuum, or mechanically, and which can also press the cup bottom part 202 into the carrier 80 such that the cup top part 204 and the cup bottom part 202 can be separated from each other.

In an embodiment, of which an example is shown in the drawings, there may be a visual inspection assembly 170 downstream of the decapping assembly 160. The visual inspection assembly 170 is also disposed downstream of the curing assembly 130 and is provided with a camera module and configured for visual inspection of the lens 200 which is in the cup bottom part 202. With the aid of the visual inspection, for example, bubbles, bits of dirt and scratches in the lens 200 can be observed or other damage to the lens 200 may be observed. The visual inspection station 170 can comprise, for example, a CCD camera with the aid of which a photograph of the lens 200 is taken. Further, downstream of the decapping assembly 160 is a second optical inspection assembly 150 which is configured for determining at least one optical combination parameter of the combination of the cured monomeric material formed into a lens 200 and the cup part 202, 204 that bears the lens 200, the at least one combination parameter being of the same type as the at least one cup part parameter. This second optical inspection assembly 150 may, just like the first optical assembly, be implemented as a Shack-Hartmann wavefront sensor (for instance supplied by Optocraft GmbH).

After the second optical inspection assembly 150 has been passed, the carrier 80 having therein the lens-bearing cup part 202 or 204 and lens 200, is conveyed to a discharge section 180 which is clearly visible in the top plan view of FIG. 3. The discharge section 180 is disposed downstream of the second inspection assembly 150 and is provided with a discharge section transport path part 182 which is indicated with the broken line and which is part of the transport path 100. The discharge section transport path part has an entrance which links up with a part of the transport path part extending along the second inspection assembly 150. The discharge section transport path part 182 has an exit which links up with the carrier intake position 102. The discharge section 180 is provided with a reject assembly 184 for rejected lenses 200. The reject assembly 184 is configured for removing from a carrier 80 the lens-bearing cup part 202 or 204 with the rejected lens 200 present therein and for discharging the cup part 202 or 204 with lens 200 to a waste provision 184 and for leading on the respective carrier 80 in the discharge section transport path part 182. Further, the discharge section 180 is provided with an exit assembly 186 which is configured for removing the cup part 202 or 204 bearing the lens 200 from the carrier 80 for further processing. The exit assembly 186 is further configured for leading on the respective emptied carrier 80 in the discharge section transport path part 182 to the carrier intake position 102.

The electronic control 14 of the system 10 is provided with a memory 16, preferably a shift register memory. Of each combination of cup bottom part 202, cup top part 204 and the lens 200 formed therein, production parameters and/or measuring data and/or cup part parameters, combination parameters and/or lens parameters are stored. The production parameters and/or measuring data can comprise at least one of the following data:
batch designation of the plastic from which the cup bottom part and the cup top part are manufactured;
temperature during injection molding;
injection pressure during injection molding;
closing force of the mold parts;

magnitude and/or duration of after-pressure during injection molding;

temperature during after-pressure during injection molding;

cooling time of the cup bottom part 202 and the cup top part 204;

the at least one cup part parameter;

amount of injected monomeric material;

batch designation of the monomeric material;

residence time in the curing assembly 130;

measuring data of a visual inspection, such as for instance a photograph of the lens 200 which is in the cup part 202 or 204 bearing the lens 200;

the at least one optical combination parameter; and the at least one optical lens parameter.

In an embodiment, the electronic control 14 may be configured for monitoring a trend change of at least the lens parameters of a series of produced lenses 200. Of the lens parameters, parameters that are indicative of the quality of the lens power map are the most relevant. When that lens power map does not satisfy the requirements anymore, the lens 200 cannot be sold. The electronic control 14 in this embodiment is configured for, during production, regulating at least one production parameter on the basis of the observed trend change to control that trend change. The at least one production parameter can be chosen from the group comprising:

composition of the plastic from which the cup bottom part 202 and the cup top part 204 are manufactured;

temperature during injection molding;

injection pressure during injection molding;

closing force of the mold parts;

magnitude and/or duration of after-pressure during injection molding;

temperature during after-pressure during injection molding;

cooling time of the cup bottom part 202 and the cup top part 204;

amount of monomeric material introduced into the cup bottom part 202;

composition of the monomeric material; and residence time in the curing assembly 130.

In an embodiment of a system, each carrier 80 may be provided with an RFID tag 82 which is in communicative connection with the electronic control 14. The electronic control 14 is configured for storing in its memory 16 the ID code of the RFID tag in conjunction with the associated production parameters, measuring data, cup part parameters, combination parameters and/or lens parameters of the combination of cup bottom part 202, cup top part 204 and the lens 200 formed therein which are transported in the respective carrier 80. Thus, during transport of the carrier 80 through the system it can be established at certain points whether the expected carrier 80 actually arrives at the respective spot. Indeed, if transport in the system were disturbed for some reason, a wrong carrier might arrive at a station. Through the presence of the RFID tag 82 in each carrier 80, such mistransport is quickly observed and an operator can be alerted to check the system.

The invention further relates to a method comprising the following steps:

with the aid of injection molding, manufacturing a cup bottom part 202 and a cup top part 204 to form a cast mold which comprises a cup bottom part 202 and a cup top part 204;

cooling the cup bottom part 202 and cup top part 204;

by means of a first optical measurement, determining at least one optical cup part parameter of at least the cup part 202, 204 that bears the lens after a curing step;

injecting an amount of monomeric material into the cup bottom part 202 and after injection placing the cup top part 204 on the cup bottom part 202;

curing the monomeric material;

by means of a second optical measurement, determining at least one optical combination parameter of the combination of the cured monomeric material formed into a lens 200 and the cup part 202, 204 that bears the lens 200, the at least one combination parameter being of the same type as the at least one optical cup part parameter;

by calculation, determining at least one optical lens parameter of the lens 200 on the basis of the at least one cup parameter and at least one combination parameter, the at least one lens parameter being of the same type as the at least one cup part parameter.

Thus, in an efficient manner a lens parameter of the lens is determined without the lens needing to be removed from the cup bottom part 202. Preferably, the lens parameter is of a type that characterizes the quality of the lens power map.

In an embodiment, a method is provided which comprises repeating the above-mentioned method for forming a series of cup bottom parts 202, cup top parts 204 and lenses 200. The method further comprises monitoring trend changes of at least the lens parameters of the series of lenses 200 and, during production, regulating at least one production parameter for control of the trend change.

With such a method the advantage is achieved that the lenses 200 that are produced are always within a quality bandwidth. Accordingly, no lenses are produced that are to be rejected, since even before such a poor lens would be produced, the system has already been adjusted on the basis of the monitoring of trend changes of already-produced lenses.

While the invention has been represented and described in detail with reference to the drawing, this drawing and this description are to be regarded merely as an example. The invention is not limited to the embodiment described. Features that are described in preceding claims can be combined with each other. The reference numerals in the claims should not be construed as limitations of the claims but serve for clarification only. Different variants are possible. Instead of the rotating buffering table 30 as cooling device, also a linear cooling device may be provided. Instead of a SCARA robot, also a different type of robot may be used. Also the implementation of the curing assembly is given only by way of example. Of relevance is that by monitoring cup part parameters, combination parameters and lens parameters, improperly produced specimens of cup parts and/or lenses can be removed from production. In a further elaboration the parameters determined can be used to observe trend changes in them and, on the basis thereof, adjust the production parameters, so that the produced lenses remain within a defined bandwidth. Further, it is to be noted that the term lens is to be understood to encompass an object that is still to undergo an aftertreatment. To be considered in this regard is, for example, a lens blank for an intraocular lens in the form of a lens with an annular disc surrounding the lens. From this annular disc, parts may be cut away in an aftertreatment to form haptics.

The invention claimed is:

1. A system for manufacturing ophthalmic devices, comprising:
   at least one injection molding machine configured for manufacturing a cup bottom part and cup top part to form a cast mold comprising a cup bottom part and cup top part;
   a cooling station;
   a plurality of carriers which are transportable along a transport path through a part of the system;
   a manipulator assembly which is configured for:
   taking a said cup bottom part and a said cup top part out of the at least one injection molding machine and placing them in the cooling station; and
   taking the cup bottom part out of the cooling station and placing it on a carrier of said plurality of carriers that is in a carrier intake position, and configured for placing a said cup top part on the cup bottom part placed on the carrier;
   an injection assembly which is arranged for injecting an amount of monomeric material into the cup bottom part;
   a curing assembly provided with lamps emitting electromagnetic radiation which promotes the hardening of the monomeric material;
   a first optical inspection assembly which is disposed upstream of the injection assembly, wherein the first optical inspection assembly is configured for determining at least one first optical cup part parameter of at least the cup part that bears the lens in a part of the system downstream of the curing assembly, the at least one first optical cup part parameter being of a particular type indicative of a characteristic of the lens;
   a second optical inspection assembly which is disposed after the curing assembly and which is configured for determining at least one optical combination parameter of the combination of the cured monomeric material formed into a lens and the cup part that bears the lens, the at least one combination parameter being of the same particular type indicative of the same characteristic of the lens as the at least one first optical cup part parameter; and
   an electronic control provided with a calculation module for determining at least one optical lens parameter of the lens on the basis of the at least one first optical cup part parameter and at least one optical combination parameter determined in the first and the second optical inspection assembly, the at least one optical lens parameter being of the same particular type indicative of the same characteristic of the lens as the at least one first optical cup part parameter.

2. The system according to claim 1, wherein the at least one first optical cup part parameter, the at least one optical combination parameter and the at least one optical lens parameter are of a particular type indicative of a characteristic of the lens selected from a group of parameter types which comprises:
   a parameter indicative of the lens power map;
   the dioptry of the lens averaged over the surface;
   minimum and maximum dioptry of the lens;
   corrected wave front PN (wave front peak/valley);
   corrected wave front RMS (root mean square of the absolute peak valley);
   Point Spread Function (PSF);
   Modulation Transfer Function (MTF);
   Phase Transfer Function (PTF);
   a parameter indicative of cosmetic defects, including at least one of scratches, bubbles and pits;
   a radius of curvature (ROC);
   an axis for toric lenses;
   surface form deviations; and
   Zernike coefficients or Zernike polynomials ($Z^m_n$).

3. The system according to claim 1, provided with:
   a decapping assembly for removing one of the cup parts for exposing the lens, the decapping assembly being disposed along the transport path, downstream of the curing assembly and upstream of the second optical inspection assembly.

4. The system according to claim 1, provided with:
   a visual inspection assembly which is disposed downstream of the curing assembly and which is provided with a camera module and which is configured for visual inspection of the lens which is in the lens-bearing cup part.

5. The system according to claim 1, wherein the electronic control is provided with a memory in which, of each combination of cup bottom part, cup top part and the lens formed therein, at least one of production parameters, measuring data, cup part parameters, combination parameters and lens parameters are stored.

6. The system according to claim 5, wherein at least one of the production parameters and measuring data comprises at least one of the following data:
   batch designation of the plastic from which the cup bottom part and the cup top part are manufactured;
   temperature during injection molding;
   injection pressure during injection molding;
   closing force of the mold parts;
   at least one of magnitude and duration of after-pressure during injection molding;
   temperature during after-pressure during injection molding;
   cooling time of the cup bottom part and the cup top part;
   the at least one optical cup part parameter;
   amount of injected monomeric material;
   batch designation of the monomeric material;
   residence time in the curing assembly;
   measuring data of a visual inspection;
   the at least one optical combination parameter; and
   the at least one optical lens parameter.

7. The system according to claim 1, wherein the electronic control is configured for monitoring a trend change of at least one optical lens parameters of a series of produced lenses, and wherein the electronic control is configured for, during production, regulating at least one production parameter on the basis of the observed trend change to control the trend change, the at least one production parameter being selected from the group comprising:
   composition of the plastic from which the cup bottom part and the cup top part are manufactured;
   temperature during injection molding;
   injection pressure during injection molding;
   closing force of the mold parts;
   at least one of magnitude and duration of after-pressure during injection molding;
   temperature during after-pressure during injection molding;
   cooling time of the cup bottom part and the cup top part;
   amount of monomeric material introduced into the cup bottom part;
   composition of the monomeric material; and
   residence time in the curing assembly.

8. The system according to claim 1, wherein each carrier is provided with an RFID tag which is in communicative connection with the electronic control, wherein the electronic control is configured for storing in the memory thereof the ID code of the RFID tag in conjunction with at least one of the associated production parameters, measuring data, cup part parameters, combination parameters and lens parameters of the combination of cup bottom part, cup top part and the lens formed therein which are transported in the respective carrier.

9. The system according to claim 1, wherein the curing assembly is provided with:
a supply path for carriers, the supply path extending in a first direction and being part of the transport path;
a plurality of curing paths extending mutually parallel and extending perpendicularly to the supply path and each provided with a feed-in side which borders on and links up with the supply path, such that a carrier is slidable from the supply path into a said curing path, each curing path being further provided with a discharge side and being part of the transport path; and
a discharge path for carriers, which discharge path extends parallel to the supply path, the discharge path bordering on the discharge sides of the plurality of curing paths and linking up therewith, such that a carrier of a said curing path is slidable onto the discharge path, the discharge path being part of the transport path.

10. The system according to claim 9, wherein the supply path is provided with an endless conveyor for the transport of the carriers.

11. The system according to claim 9, wherein the discharge path is provided with an endless conveyor for the transport of the carriers.

12. The system according to claim 9, wherein each curing path associated with a pusher which is disposed next to the supply path and which is arranged for sliding a carrier from the supply path into a curing path and for thereby pushing up the carriers already present in the respective curing path in the direction of the discharge path.

13. The system according to claim 1, provided with:
a discharge section which is disposed downstream of the second inspection assembly and which is provided with:
a discharge section transport path part which is part of the transport path and which has an entrance which links up with a part of the transport path that extends along the second inspection assembly, the discharge section transport path part having an exit which links up with the carrier intake position;
a reject assembly for rejected lenses which is configured for removing from a carrier the cup part that bears the lens with the rejected lens present therein, and for discharging the respective cup part with lens to a waste provision and for leading on the respective carrier in the discharge section transport path part; and
an exit assembly which is configured for removing from a carrier the cup part that bears the lens with the lens present therein, for further processing, and which is configured for leading on the respective emptied carrier in the discharge section transport path part to the carrier intake position.

14. A method for manufacturing ophthalmic devices comprising the steps of:
with an aid of injection molding, manufacturing a cup bottom part and a cup top part to form a cast mold which comprises a cup bottom part and a cup top part;
cooling the cup bottom part and cup top part;
by means of a first optical measurement, determining at least one optical cup part parameter of at least the cup part that bears the lens after a curing step, the at least one optical cup part parameter being of a particular type indicative of a characteristic of the lens;
injecting an amount of monomeric material into the cup bottom part and after injection placing the cup top part on the cup bottom part;
curing the monomeric material;
by means of a second optical measurement, determining at least one optical combination parameter of the combination of the cured monomeric material formed into a lens and the cup part that bears the lens, the at least one optical combination parameter being of the same particular type indicative of the same characteristic of the lens as the at least one optical cup part parameter; and
by calculation, determining at least one optical lens parameter of the lens on the basis of the at least one optical cup part parameter and at least one optical combination parameter, the at least one optical lens parameter being of the same particular type indicative of the same characteristic of the lens as the at least one optical cup part parameter.

15. The method according to claim 14, further comprising the steps of:
repeating the above-described method to form a series of cup bottom parts, cup top parts and lenses;
monitoring trend changes of the lens parameters of the series of lenses; and
during production, regulating at least one production parameter to control the trend change.

16. The system according to claim 5, wherein the memory is a shift memory.

17. The system according to claim 2, provided with:
a decapping assembly for removing one of the cup parts for exposing the lens, the decapping assembly being disposed along the transport path, downstream of the curing assembly and upstream of the second optical inspection assembly.

18. The system according to claim 2, provided with:
a visual inspection assembly which is disposed downstream of the curing assembly and which is provided with a camera module and which is configured for visual inspection of the lens which is in the lens-bearing cup part.

19. The system according to claim 3, provided with:
a visual inspection assembly which is disposed downstream of the curing assembly and which is provided with a camera module and which is configured for visual inspection of the lens which is in the lens-bearing cup part.

20. The system according to claim 2, wherein the electronic control is provided with a memory in which, of each combination of cup bottom part, cup top part and the lens formed therein, at least one of production parameters, measuring data, cup part parameters, combination parameters and lens parameters are stored.

21. The system according to claim 6, wherein the visual inspection is a photograph of the lens which is in the lens-bearing cup part.

* * * * *